(No Model.)
P. SCOTT.
MEASURING APPARATUS FOR DEEP WELLS.
No. 516,635. Patented Mar. 13, 1894.
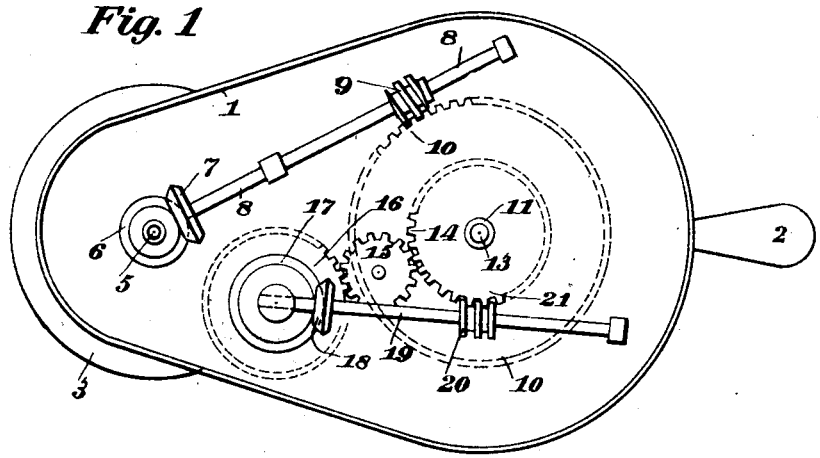
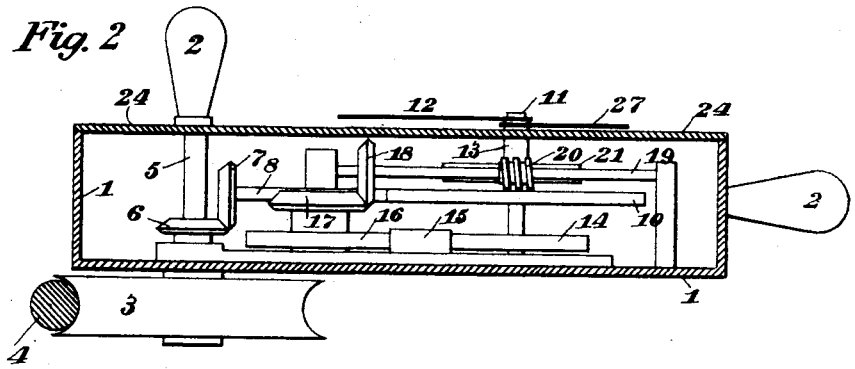
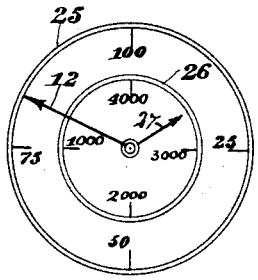
WITNESSES:
INVENTOR:
Peter Scott,
By C. D. Lewis
Attorney.

United States Patent Office.

PETER SCOTT, OF ALLEGHENY, PENNSYLVANIA.

MEASURING APPARATUS FOR DEEP WELLS.

SPECIFICATION forming part of Letters Patent No. 516,635, dated March 13, 1894.

Application filed May 9, 1892. Serial No. 432,399. (No model.)

*To all whom it may concern:*

Be it known that I, PETER SCOTT, a citizen of the United States, residing at Allegheny, in the county of Allegheny and State of Pennsylvania, have invented certain new and useful Improvements in Measuring Apparatus for Deep Wells; and I do hereby declare the following to be a full, clear, and exact description of the invention, such as will enable others skilled in the art to which it pertains to make and use the same, reference being had to the accompanying drawings, which form a part of this specification.

My invention relates to an improved device for measuring the depth of oil wells or other deep wells, and consists in certain details of construction, and combination of parts as will be fully described hereinafter.

In the accompanying drawings Figure 1 is a plan view of my improved measuring device having the lid or cover and dials removed therefrom, the better to show the inner working parts. Fig. 2 is a central sectional side elevation of the same. Fig. 3 is a face view of the dials.

To construct an apparatus in accordance with my invention I provide a box 1 of a suitable size and form of construction and mount therein a short shaft 5 to which a large sheave 3 is attached which when brought in contact with a moving drilling rope 4 will rotate. Attached to this shaft is a beveled pinion 6 which is in mesh with another pinion, 7, secured to a shaft 8, bearing a worm 9. This shaft operates, by means of its worm 9, a large worm wheel 10 secured to a shaft 13, which operates the pointer 12 to indicate the number of feet on a large dial 25. Attached to this shaft 13 is a gear or toothed wheel 14 which by means of a train of gearing 15, 16—17—18, worm 20 and wheel 21 reduces the speed of the said shaft 13 and transmits motion to a sleeve 11 placed about the same. Connected to this sleeve 11 is a short pointer 27 which indicates hundreds and thousands on a small dial 26.

In operation the wheel 3 is held against the drilling rope 4 when lowering the tool into the well. The proportion of the wheel 3 and its gearing are such that each revolution of the same will be indicated in feet, on the two dials.

Having thus described my invention, what I claim, and desire to secure by Letters Patent, is—

The combination with a casing, of two shafts, 5 and 13, journaled therein, one end of each of which projects from opposite sides of said casing, a grooved sheave mounted on the exterior end of shaft 5, the grooved periphery of which sheave projects beyond the edges of said casing, a pinion 6, mounted on said shaft 5, a cross shaft 8, journaled in the casing and having at one end a pinion 7, meshing with the said pinion 6 and at its other end a worm, a large worm wheel 10, fixed on the shaft 13, and meshing with the worm of shaft 8, a gear wheel 14, fixed on shaft 13, a sleeve 11, having a small worm wheel 21, fixed thereto, said sleeve being arranged on shaft 13, a cross shaft 19, journaled in the casing and having a worm engaging with the worm wheel 21, reducing gearing intermediate between said shaft 19 and gear wheel 14, whereby the former is driven from the latter at a reduced speed, a dial arranged on the outside of the casing surrounding the projecting end of shaft 13, and pointers mounted respectively on the projecting ends of shafts 13 and sleeve 11, substantially as set forth.

In testimony that I claim the foregoing I hereunto affix my signature this 14th day of November, A. D. 1891.

PETER SCOTT. [L. S.]

In presence of—
 M. E. HARRISON,
 JAS. J. MCAFEE.